(12) United States Patent
Biss et al.

(10) Patent No.: US 7,347,376 B1
(45) Date of Patent: Mar. 25, 2008

(54) APPARATUS AND METHOD FOR VERIFYING PRINT QUALITY OF AN ENCODED INDICIUM

(75) Inventors: Charles E. Biss, Auburn, NY (US); Andrew Longacre, Jr., Skaneateles, NY (US); William H. Havens, Marcellus, NY (US); Donna M. Fletcher, Auburn, NY (US); Eunice Sonneville, Ontario, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 0 days.

(21) Appl. No.: 10/664,581

(22) Filed: Sep. 17, 2003

(51) Int. Cl.
G06K 7/10 (2006.01)
(52) U.S. Cl. .................. 235/472.01; 235/455
(58) Field of Classification Search ........... 235/439, 235/462.1, 462.43, 472.01, 449–455, 472.02, 235/472.03; 250/239, 208.6
See application file for complete search history.

(56) References Cited

U.S. PATENT DOCUMENTS

| | | | |
|---|---|---|---|
| 4,488,679 A | * | 12/1984 | Bockholt et al. ........... 235/469 |
| 4,699,531 A | | 10/1987 | Ulinski, Sr. et al. |
| 4,705,939 A | | 11/1987 | Ulinski, Sr. |
| 4,860,226 A | | 8/1989 | Martin et al. |
| 5,051,567 A | | 9/1991 | Tedesco |
| 5,194,720 A | | 3/1993 | Reinnagel et al. |
| 5,218,190 A | | 6/1993 | Hardesty et al. |
| 5,231,293 A | | 7/1993 | Longacre, Jr. |
| 5,285,056 A | | 2/1994 | Tedesco et al. |
| 5,313,373 A | | 5/1994 | Bjorner et al. |
| 5,334,825 A | | 8/1994 | Maddox |
| 5,504,315 A | | 4/1996 | Hardesty et al. |
| 5,564,841 A | | 10/1996 | Austin et al. |
| 5,567,934 A | * | 10/1996 | Zheng et al. ........... 250/237 R |
| 5,569,899 A | | 10/1996 | Tedesco |
| 5,569,902 A | | 10/1996 | Wood et al. |
| 5,585,616 A | * | 12/1996 | Roxby et al. .......... 235/462.06 |
| 5,600,116 A | * | 2/1997 | Seo et al. ................... 235/455 |
| 5,633,488 A | | 5/1997 | Spitz |

(Continued)

FOREIGN PATENT DOCUMENTS

| | | |
|---|---|---|
| EP | 1 357 505 A | 10/2003 |
| JP | 896062 A | 4/1996 |
| WO | WO 9714110 A1 | 4/1997 |

OTHER PUBLICATIONS

U.S. Appl. No. 10/982,393, filed Nov. 5, 2004, Biss et al.

(Continued)

*Primary Examiner*—Daniel Stcyr
(74) *Attorney, Agent, or Firm*—Marjama Muldoon Blasiak & Sullivan LLP

(57) ABSTRACT

The invention is an apparatus configured to provide self-alignment in use when measuring the print quality of an encoded indicium. The apparatus is configured to exclude ambient light, and to align an encoded indicium located at a first aperture defined in a first surface of the apparatus with an imager positioned at a second aperture defined in a second surface of the apparatus. A source of illumination is provided to illuminate the encoded indicium during an interval when the encoded indicium is undergoing a verification process. An illumination control is provided to control the source of illumination. The apparatus can be controlled using a computer and a computer program recorded on a machine-readable medium.

30 Claims, 10 Drawing Sheets

U.S. PATENT DOCUMENTS

| | | | |
|---|---|---|---|
| 5,729,001 A | | 3/1998 | Spitz |
| 5,739,520 A | | 4/1998 | Atsumi et al. |
| 5,786,586 A | * | 7/1998 | Pidhirny et al. ....... 235/472.01 |
| 5,837,983 A | | 11/1998 | Actis et al. |
| 5,850,080 A | | 12/1998 | Herzig |
| 5,914,474 A | | 6/1999 | Spitz |
| 5,939,697 A | | 8/1999 | Spitz |
| 5,959,282 A | | 9/1999 | Tabuchi |
| 5,979,763 A | | 11/1999 | Wang et al. |
| 6,000,615 A | | 12/1999 | Spitz |
| 6,000,616 A | | 12/1999 | Spitz |
| 6,016,135 A | * | 1/2000 | Biss et al. .................. 345/179 |
| 6,036,091 A | | 3/2000 | Spitz |
| 6,036,094 A | | 3/2000 | Goldman et al. |
| 6,036,095 A | * | 3/2000 | Seo ........................ 235/472.01 |
| 6,045,047 A | | 4/2000 | Pidhirny et al. |
| 6,216,951 B1 | | 4/2001 | Swift et al. |
| 6,244,764 B1 | | 6/2001 | Lei et al. |
| 6,247,645 B1 | * | 6/2001 | Harris et al. ................ 235/454 |
| 6,325,288 B1 | | 12/2001 | Spitz |
| 6,328,213 B1 | | 12/2001 | He et al. |
| 6,354,503 B1 | | 3/2002 | Chiu |
| 6,513,715 B2 | | 2/2003 | Heske, III |
| 6,533,175 B1 | | 3/2003 | Herzig et al. |
| 6,535,299 B1 | | 3/2003 | Scherz |
| 6,561,612 B2 | | 5/2003 | Minckler |
| 6,606,395 B1 | | 8/2003 | Rasmussen et al. |
| 6,700,997 B1 | | 3/2004 | Spitz |
| 6,739,513 B1 | | 5/2004 | McClellan et al. |
| 6,788,293 B1 | * | 9/2004 | Silverbrook et al. ........ 345/173 |
| 6,802,449 B2 | | 10/2004 | Schuessler |
| 2002/0017567 A1 | | 2/2002 | Connolly et al. |
| 2002/0023958 A1 | | 2/2002 | Duanfeng et al. |
| 2004/0129784 A1 | | 7/2004 | Iwaguchi et al. |

OTHER PUBLICATIONS

International Standard ISO/IEC 15415, First Edition Jun. 15, 2004, Information technology—Automatic Identification and data capture techniques—Bar code print quality test specification—Two-dimensional symbols (Reference No. ISO/IEC 15415:2004(E)), pp. i-vi, 1-49.

International Standard ISO/IEC 15426-1, First Edition Jul. 15, 2000, Information technology—Automatic identification and data capture techniques—Bar code verifier conformance specifications—Part 1: Linear symbols (Reference No. ISO/IEC 15426-1:2000(E)), pp. i-v, 1-8.

International Standard ISO/IEC 15416, First Edition Aug. 15, 2000, (Reference No. ISO/IEC 14316;2000E), pp. 1-34.

American National Standard for Information Systems-Bar Code Print Quality-Guideline, ANSIX3, 182-1990, pp. 1-29.

American National Standard for Information Systems-Bar Code Print Quality-Guideline, ANSIX3, 182-1990 (R95), pp. 1-24.

Alan V. Oppenheim, Alan S. Willsky with Ian T. Young, Signals and Systems, Prentice-Hall Signal Processing Series, 1983, pp. 521-526.

Skan-A-Matic Corp., The EAN/UPC Verifier To Evaluate And Measure EAN and UPC Code Symbols, Specification Information (4 pgs.). Reference published more than one year prior to filing date of present application.

PCT Notification of Transmittal of The International Search Report and The Written Opinion of The International Searching Authority, International Application No. PCT/US2005/040287, Mar. 10, 2006, 14 pgs.

* cited by examiner

APPARATUS AND METHOD FOR VERIFYING PRINT QUALITY OF AN ENCODED INDICIUM

COPYRIGHT NOTIFICATION

Portions of this patent application contain materials that are subject to copyright protection. The copyright owner has no objection to the facsimile reproduction by any person of the patent document as it appears in the patent file or records after it is publicly available from the United States Patent and Trademark Office, but otherwise reserves all copyright rights whatsoever.

FIELD OF THE INVENTION

The invention relates to verifiers for encoded indicia in general and particularly to a verifier that employs a hollow chamber to control operating features of the verifier.

BACKGROUND OF THE INVENTION

Verifiers, as the term is used herein, are devices that are used to measure encoded indicia and to provide qualitative and/or quantitative analysis of the suitability of the encoded indicia for particular applications, i.e., a measurement of the quality of the encoded indicium, or qualification of the encoded indicium. Verifiers used to examine encoded indicia comprising one-dimensional (1D) and two-dimensional (2D) bar codes, optically recognized characters, and other optically observable symbols are well known. Optical verifiers described in the patent literature for examining encoded indicia include those that use laser scanners, those that use linear arrays of optical detectors such as charge-coupled devices (CCDs), and those that use two-dimensional arrays of optical detectors, such as CCD arrays and vidicons. In general, the verifiers that have been described in the literature are reported to be useful in the analysis of the quality of encoded indicia over the widest possible range of conditions, including operation at arbitrary and variable distances, operation under a variety of ambient illuminating conditions, and operation using moving encoded indicia as targets for qualification.

Certain standards for qualifying various encoded indicia have been available for some time, such as American National Standards Institute (ANSI) Specification "Bar Code Print Quality Guideline" X3.182-1990 and the "UPC Symbol Specification Manual" and "Quality Specification for the UPC Printed Symbol", published by the Uniform Code Council, Inc., Dayton, Ohio 1993. The ANSI specifications assign a letter grade, "A" through "F", to the encoded indicium based on the lowest letter grade obtained on several different test parameters.

The prior art verifier systems suffer from various problems. For example, one prior art system requires the user to calibrate the verifier before each usage, in order to determine a working distance and orientation to a target encoded indicium. The calibration procedure requires at least one calibration standard, and may require multiple calibration standards. In some prior art systems, the user must configure the imaging system to obtain a spot size at the target encoded indicium according to the requirements of the ANSI specification. Some prior art systems require the user to manually orient the imager (or an extension thereof) used to obtain an image of the target encoded indicium so that a plurality of switches or contact indicators are simultaneously activated before the verifier can operate. Other prior art systems require the user to confirm visually that the imager is correctly aligned with the target encoded indicium.

There is a need for a verifier that is simple and convenient to operate, but that overcomes all of the shortcomings of the prior art.

SUMMARY OF THE INVENTION

A verifier system that overcomes all of the above enumerated difficulties and limitations, but that is nevertheless simple and convenient for a user to operate is disclosed herein. The inventive system provides all of the benefits of a verifier system that would be found in a high quality darkroom laboratory setting, but that eliminates many, if not all, of the tedious details of setting up a darkroom-type verification apparatus as would be found in a laboratory setting. Briefly stated, the system comprises a hollow chamber configured to provide a view of the target encoded indicium, configured to support each of a plurality of different types of imaging sensors at a distance and angle calculated to provide an optimal view of the encoded indicium, and configured to support on the interior surface of the chamber one or more sources of illumination configured to illuminate the target encoded indicium with controlled illumination intensity. The hollow chamber is configured to exclude ambient illumination. The system can be calibrated as necessary using a single calibration standard, but need not be calibrated before each use, or before any particular use. The user is not required to visually align the target encoded indicium and the imaging sensor; rather, the alignment is automatically provided by the proper assembly of the system using the hollow chamber according to principles of the invention.

In one aspect, the invention relates to a self-aligning structure for use in measuring the quality of an encoded indicium. The self-aligning structure comprises a hollow chamber that comprises a first surface defining a first aperture, the first aperture representing a viewing area of an imager used to obtain an image of the encoded indicium; a second surface defining a second aperture, the second aperture configured to support the imager in a position to obtain the image of the encoded indicium; at least one source of illumination situated within the hollow chamber, the at least one source of illumination configured to illuminate the encoded indicium; and an illumination control operatively coupled to control the at least one source of illumination. The hollow chamber is configured to be positioned adjacent the encoded indicium such that, when the encoded indicium is positioned within the viewing area, when an imager is supported in the second aperture, and when the at least one illumination source is properly controlled, the structure is self-aligned and the imager can obtain at least one image of the encoded indicium from which image the quality of the encoded indicium can be measured.

In one embodiment, the hollow chamber is configured to exclude extraneous illumination when the imager is present and the hollow chamber is positioned adjacent the encoded indicium. In one embodiment, the hollow chamber is configured to support the imager in a defined position relative to the encoded indicium. In one embodiment, the defined position comprises a defined distance. In one embodiment, the defined position comprises a defined angle. In one embodiment, the hollow chamber is constructed in a plurality of sections, a first section comprising the first surface defining the first aperture representing the viewing area of the imager of the encoded indicium, and a second section comprising the second surface defining the second aperture configured to support the imager in the position to obtain the image of the encoded indicium. In one embodiment, the hollow chamber is configured to remain mechanically stable when the imager is positioned within the second aperture. In one embodiment, the hollow chamber further comprises an optical sensor configured to receive illumination from the at least one source of illumination for the purpose of confirming an illumination characteristic provided by the at least one source of illumination. In one embodiment, the illumination characteristic provided by the at least one source of illumination is a characteristic selected from an illumination intensity at a selected time and an illumination wavelength.

In another aspect the invention features an image quality verifier system useful for verifying the quality of an encoded indicium. The image quality verifier system comprises an imager for obtaining an image of the encoded indicium, and a self-aligning structure. The self-aligning structure comprises a hollow chamber that comprises a first surface defining a first aperture, the first aperture representing a viewing area of the imager; a second surface defining a second aperture, the second aperture configured to support the imager in a position to obtain the image of the encoded indicium; at least one source of illumination situated within the hollow chamber, the at least one source of illumination configured to illuminate the encoded indicium; and an illumination control operatively coupled to control the at least one source of illumination. The imager obtains at least one image of the encoded indicium from which image the quality of the encoded indicium can be measured when the encoded indicium is positioned within the viewing area, the imager is supported in the second aperture, and the at least one illumination source is properly controlled.

In one embodiment, the imager comprises a sensor having a linear array of photosensitive elements. In one embodiment, the imager comprises a sensor having a two-dimensional array of photosensitive elements. In one embodiment, the imager is a selected one of a one-dimensional bar code reading apparatus and a two-dimensional bar code reading apparatus.

In one embodiment, the image quality verifier system further comprises an analysis module configured to provide a measure of quality of a parameter of an encoded indicium undergoing verification relative to the same parameter of the reference encoded indicium.

In one embodiment, the image quality verifier system further comprises a memory module configured to record data indicative of a parameter of the reference encoded indicium.

In one embodiment, the hollow chamber is configured to remain mechanically stable when the imager is positioned within the second aperture. In one embodiment, the hollow chamber further comprises an optical sensor configured to receive illumination from the at least one source of illumination for the purpose of confirming an illumination characteristic provided by the at least one source of illumination. In one embodiment, the illumination characteristic provided by the at least one source of illumination is a characteristic selected from an illumination intensity at a selected time and an illumination wavelength.

In still a further aspect, the invention relates to a method of measuring the quality of an encoded indicium. The method comprises the steps of providing a self-aligning structure for positioning an imager in relation to an encoded indicium, the self-aligning structure configured to permit the imager to view the encoded indicium and configured to exclude ambient light; illuminating the encoded indicium with at least one source of illumination contained within the self-aligning structure; operating the imager to obtain at least one image of the encoded indicium; and measuring the quality of the encoded indicium from the image.

In one embodiment, the step of providing a self-aligning structure comprises positioning the self-aligning structure relative to an encoded indicium so that the encoded indicium is situated so as to be visible within a first aperture defined in a first surface of the self-aligning structure; and positioning the imager within a second aperture defined in a second surface of the self-aligning structure.

In one embodiment, the method further comprises the step of measuring a reference encoded indicium to obtain a reference parameter for calibrating the quality measurement.

In one embodiment, the method further comprises the step of monitoring a characteristic of the illumination provided by the at least one source of illumination.

In one embodiment monitoring a characteristic of the illumination provided by the at least one source of illumination comprises monitoring a selected one of an illumination intensity at a selected time and an illumination wavelength.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

In order to overcome such difficulties of set-up, calibration and operation as have been described in the section captioned "Background" hereinabove, the systems and methods proposed herein as embodiments of the invention rely on a self-aligning verifier structure comprising a hollow chamber. As will be explained presently, the self-aligning structure provides for the proper alignment and spacing of a target encoded indicium to be examined for quality (or "verified") with regard to an image sensor selected from a variety of possible image sensor types that are available for use. The system further excludes ambient illumination, and provides controlled illumination during the examination of the target encoded indicium to be verified. Since the image sensor and the target encoded indicium do not move during the verification process, alignment is a straightforward process, and is based on distances, angles of view, and illumination levels that have been pre-calculated for a target encoded indicium of a known kind and for an image sensor of a known kind. Alignment and exposure levels are assured to the extent that the system is properly assembled and the illumination source is functional and properly controlled. An optical sensor that serves to check the illumination level, the illumination wavelength, and the time in which the illumination source is active is optionally provided.

Figure 1:
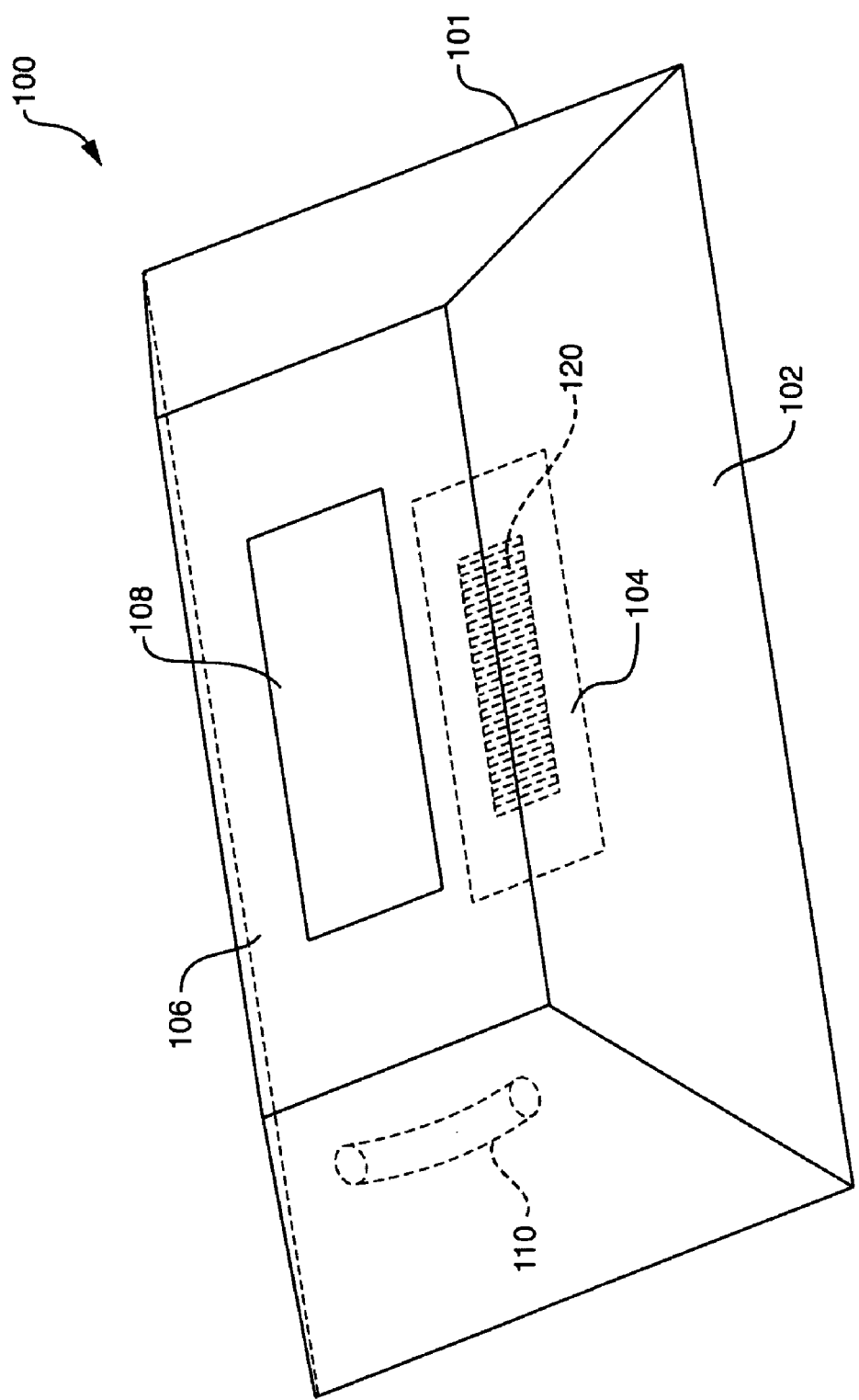
FIG. 1 is a perspective drawing showing features of one embodiment of a self-aligning structure for use in measuring the quality of an encoded indicium, according to principles of the invention.

Turning to FIG. 1, there is a perspective drawing showing features of one embodiment of a self-aligning structure 100 for use in measuring the quality of an encoded indicium. The self-aligning structure 100 comprises a hollow chamber 101. In one embodiment, the hollow chamber 101 has a trapezoidal cross section in elevation, as shown in FIG. 1. However, other shapes for the elevation of the hollow chamber 101 are also suitable for use as a self-aligning structure, such as a rectangular shape, a cubic shape, a pyramidal shape comprising at least three sides, or a curved shape, such as a hemispherical shape. The hollow chamber 101 comprises a first surface 102 defining a first aperture 104. The first aperture 104, shown in phantom, represents a viewing area of an imager (not shown in FIG. 1, but see FIG. 3) that is used to obtain an image of an encoded indicium 120. In FIG. 1, encoded indicium 120 is shown for simplicity as a linear or one-dimensional bar code. However, those of ordinary skill will recognize that the encoded indicium can be any encoded representation of information, such as two-dimensional bar codes, or stacked bar codes. The hollow chamber 101 can be positioned adjacent the encoded indicium 120 such that the encoded indicium 120 is positioned within the viewing area defined by the first aperture 104. As necessary, an opaque gasket is provided on the undersurface of surface 102 in a closed locus outside the dimensions of first aperture 104 to optically seal the encoded indicium 120 from extraneous light that might otherwise enter laterally (e.g., in a direction substantially parallel to the plane of the encoded indicium 120).

As shown in FIG. 1, the hollow chamber 101 comprises a second surface 106 defining a second aperture 108. The second aperture 108 is configured to support the imager in a position to obtain the image of the encoded indicium 120. The imager can be any conventional imager known in the art, and in particular can be an imager such as is described in U.S. patent application Ser. No. 10/092,789, which is assigned to the assignee of this application, the disclosure of which is incorporated by reference herein in its entirety.

In the embodiment shown in FIG. 1, the hollow chamber 101 also comprises at least one source of illumination 110 situated within the hollow chamber 101. The at least one source of illumination 110 is configured to illuminate the encoded indicium 120. In other embodiments, the imager can comprise a source of illumination for illuminating a target encoded indicium 120. An illumination control (not shown in FIG. 1, but see FIG. 3) is operatively coupled to control the at least one source of illumination, or alternatively, to control a source of illumination provided by an imager. The illumination control can in various embodiments be any one of a control that operates in response to instructions from an operator of the apparatus, that operates in response to instructions from the imager, or that operates in response to instructions from a computer used in conjunction with the self-aligning structure 100 and the imager. The hollow chamber 101 is configured to be positioned adjacent the encoded indicium 120 such that, when the encoded indicium 120 is positioned within the viewing area 104, when an imager is supported in the second aperture 108, and when the at least one illumination source 110 is properly controlled, the imager can obtain at least one image of the encoded indicium 120 from which image the quality of the encoded indicium 120 can be measured.

The at least one image of the encoded indicium 120 is preferably observed under controlled conditions of illumination. In order to control the illumination, the hollow chamber 101 is configured to exclude extraneous illumination when the imager is present and the hollow chamber is positioned adjacent the encoded indicium 120. The at least one illumination source 110 (or the alternative source of illumination provided by the imager) is controlled to provide a predetermined illumination level during the time that the imager is operating so that the conditions of measurement of the encoded indicium are well defined, and extraneous illumination, that would be uncontrolled, is excluded.

The hollow chamber 101 is configured to support the imager in a defined position relative to the encoded indicium 120. The defined position comprises at least one of a defined distance and a defined angle. The imager is thereby provided a defined view of the encoded indicium 120. As needed, an adapter piece can be interposed between the second aperture 108 and the imager, for purposes of defining one or more of the distance and angle, and/or for purposes of assuring a light-tight connection (e.g., an opaque gasket) between the hollow chamber 101 and the imager at the second aperture 108.

Figure 2:
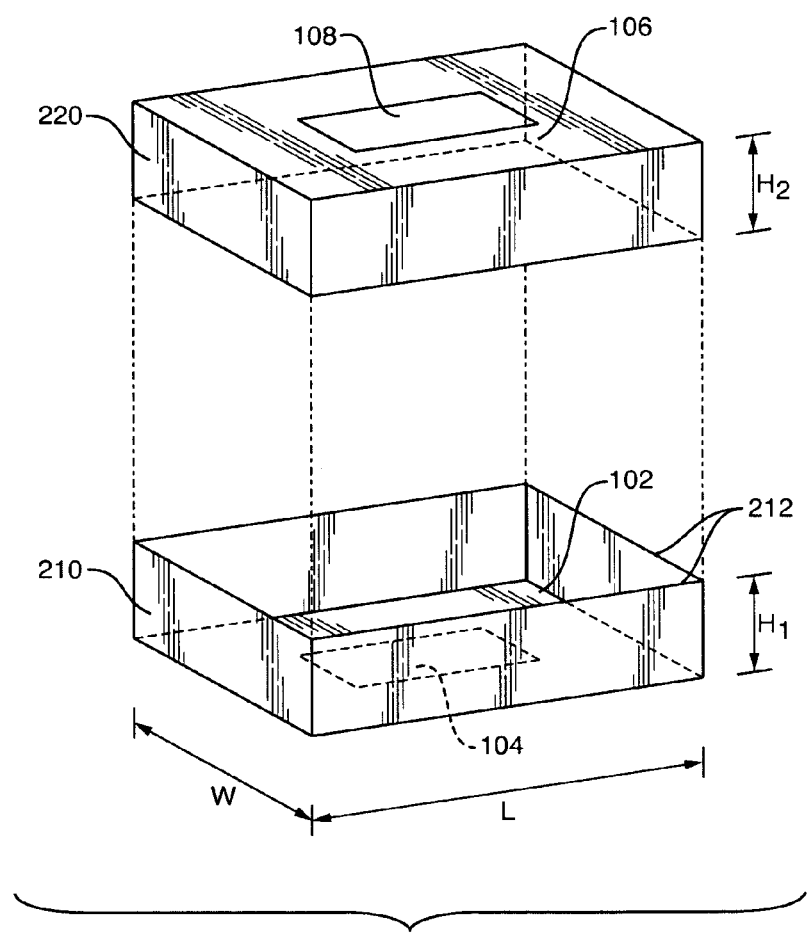
FIG. 2 is a perspective exploded view drawing showing features of another embodiment of a self-aligning structure for use in measuring the quality of an encoded indicium, according to principles of the invention.

FIG. 2 is a perspective exploded view drawing 200 showing features of another embodiment of a self-aligning structure for use in measuring the quality of an encoded indicium, in which the hollow chamber 101 is constructed in a plurality of sections. A first section 210 comprises the first surface 102 defining the first aperture 104 representing the viewing area of the imager of the encoded indicium 120. A second section 220 comprises the second surface 106 defining the second aperture 108 configured to support the imager in the position to obtain the image of the encoded indicium 120. A self-aligning structure constructed using a plurality of sections allows the measurement of a variety of encoded indicia 120 with a variety of imagers. The first section 210 and the second section 220 are designed to be oriented so that apertures 104 and 108 are suitably positioned and oriented relative to one another. As shown in the embodiment illustrated, the orientation of the two sections 210, 220 can be maintained to within 180 degrees by having unequal dimensions of length L and width W. In another embodiment, there can be unequal dimensions on at least three sides. In a further embodiment, there can be unequal angles at the junctions of pairs of adjacent sides, for example if the cross section of the self-aligning structure at the mating surface is a trapezoid, so that the two sections can have only one relative orientation upon mating. Alternatively, or additionally, there can be mating keys and keyways, or mating flange surfaces, so disposed that sections 210, 220 will be able to mate together only in the appropriate relative orientation. In the embodiment shown, the first section 210 has an effective height $H_1$ and the second section 220 has an effective height $H_2$.

Different imagers are designed to operate at different working distances from the encoded indicia that they are required to read. Different encoded indicia can have different shapes and sizes. For example, to permit the use of different imagers having different working distances, a first section 210 may be used having a defined aperture 104 that allows an encoded indicium of type A to be viewed. A plurality of second sections 220, 220', each configured to support a particular imager, may be used with the same first section 210 to measure the quality of encoded indicia of type A. Each respective second section 220, 220' has a second aperture 108, 108' configured to mate with a particular imager, and has dimensions designed to position the respective imager at the predetermined distance and/or predetermined angle with respect to the encoded indicium 120 to be imaged. By way of example, the first section 210 can be designed with a mating surface 212 at a predetermined height ($H_1$), such as one inch, above the first surface 104. Each second section 220, 220' can be designed to have the required height ($H_2$) to define the distance from the encoded indicium 120 to the imager to be $H_1+H_2$, as well as having suitable angular orientation, and suitable illumination provided by the at least one illumination source 110. A different first section 210' can be provided having a defined aperture 104' that allows an encoded indicium of type B to be viewed. Accordingly, one can configure a suitable self-aligning optical verifier for verifying an encoded indicium selected from one of Type A and Type B with either of a first imager or a second imager merely by assembling the correct first and second sections as necessary. As needed, an optically opaque gasket is provided at the mating surfaces of the first and second sections. Whether constructed in one section or in a plurality of sections, the hollow chamber 101 is configured to remain mechanically stable when the imager is positioned within the second aperture 108.

Figure 3:
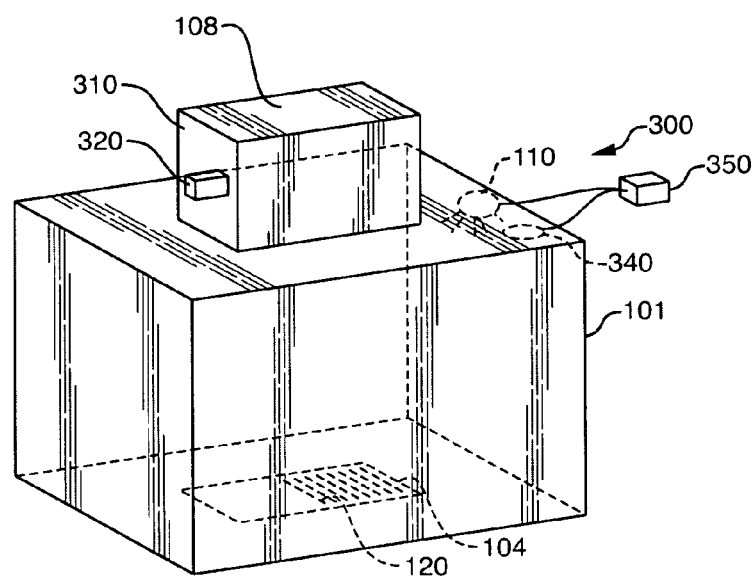
FIG. 3 is a drawing showing features of a system for measuring the quality of an encoded indicium that comprises a self-aligning structure, according to principles of the invention.

FIG. 3 is a drawing showing features of a self-aligning image quality verifier system 300 for measuring the quality of an encoded indicium that comprises a self-aligning structure 100 such as that described in conjunction with FIGS. 1 and 2. Having described the self-aligning structure 100 in detail, it will not be described further. The system 300 comprises an imager 310 for obtaining an image of the encoded indicium 120, and a hollow chamber 101. The imager 310 obtains at least one image of the encoded indicium 120 from which image the quality of the encoded indicium 120 can be measured when the encoded indicium 120 is positioned within the viewing area 104, the imager 310 is supported in the second aperture 108, and the at least one illumination source 110 is properly controlled.

The self-aligning image quality verifier system 300 can comprise any of a variety of imagers 310. In one embodiment, the imager 310 comprises a sensor having a linear array of photosensitive elements. In another embodiment, the imager 310 comprises a sensor having a two-dimensional array of photosensitive elements. As already mentioned, in various embodiments, the imager 310 is a selected one of a one-dimensional bar code reading apparatus and a two-dimensional bar code reading apparatus. In still other embodiments, the imager 310 can be an imager 310 provided as a component of a portable device such as a portable data terminal (PDT) or a personal digital assistant (PDA). The imager 310 can be internal to the portable device, or can be attached to the portable device, for example with an electrical cable comprising one or more conductors. In one embodiment, the portable device can store image data obtained by the imager 310, and at a later time, can transfer the stored image data to another data processing system, such as a centralized data processing system. The data can be transferred by wire or by wireless communication technology. The data can be transferred in a form corresponding to the form in which it is obtained by the imager 310, or in a form corresponding to processed data that is different from the form in which it is obtained from the imager 310.

The self-aligning image quality verifier system of FIG. 3 can further comprise an analysis module 320. The analysis module 320 can be integral with the imager 310, as shown, or in alternative embodiments, can be operatively connected to imager 310 by way of a wired connection such as a USB or RS-232 connection, a bus connection, or a wireless connection such as a radio or infrared communication connection. The analysis module 320 is configured to provide a measure of quality of a parameter of an encoded indicium 120 undergoing verification relative to the same parameter of a reference encoded indicium 130. In one embodiment, the analysis module 320 is a program module operating on a microprocessor. The image quality verifier system 300 can also comprise a memory module 330 configured to record data indicative of a parameter of the reference encoded indicium 130 and/or a parameter of the encoded indicium 120 undergoing verification. The memory module 330 in one embodiment is provided as part of the analysis module 320, for example as a memory chip on a computer motherboard, or as memory on a microprocessor chip active as the analysis module 320. In other embodiments, the memory module 330 is a separate memory segment within a conventional memory device such as a semiconductor memory device (e.g., RAM, SDRAM), a magnetic memory device (e.g., floppy or hard disk), or an optical memory device (e.g., CD-ROM, CD-R or CD-RW disc) that is in communication with the analysis module 320. Optionally, an illumination detector 340 is situated in visual communication with the at least one illumination source 110. The illumination detector 340 monitors the illumination source 110, to monitor a characteristic of the illumination provided by the at least one source of illumination, such as monitoring a selected one of an illumination intensity at a selected time and an illumination wavelength. The period of operation of the illumination source 110 can conveniently be determined by repetitively interrogating the illumination detector 340 over time. The illumination detector 340 is in communication with an illumination control module 350 that controls the at least one illumination source 110. Thus, if the illumination characteristic monitored by illumination detector 340 falls outside a desired range, a signal, which in some embodiments can be an error signal, is communicated to the illumination control module 350, and the illumination control module 350 takes corrective action using conventional feedback principles of operation.

In one embodiment, the self-aligning image quality verifier system comprises a computer program (i.e., software) recorded on a machine-readable medium, which when operating on a programmable computer controls a process comprising a plurality of steps. The machine-readable medium can be any conventional machine-readable medium, for example media ranging from punched cards or punched paper tape to magnetic storage media such as floppy or hard disks, magnetic tape or magnetic wire, to semiconductor media such as RAM, ROM, and EPROM, and optical media such as CD-ROM, CD-R and CD-RW discs. The process controlled by the computer program is described at a high level in the flow chart shown in FIG. 4. In one embodiment, the computer upon which the computer program operates is present within the imager 310. In other embodiments, the computer upon which the computer program operates is operatively coupled to the imager 310, and may be a general purpose computer of any conventional type, such as an Intel Pentium-based personal computer, or a computer such as those available from Apple Computer, Inc., including a laptop computer, a desktop computer, or a handheld computer.

Figure 4:
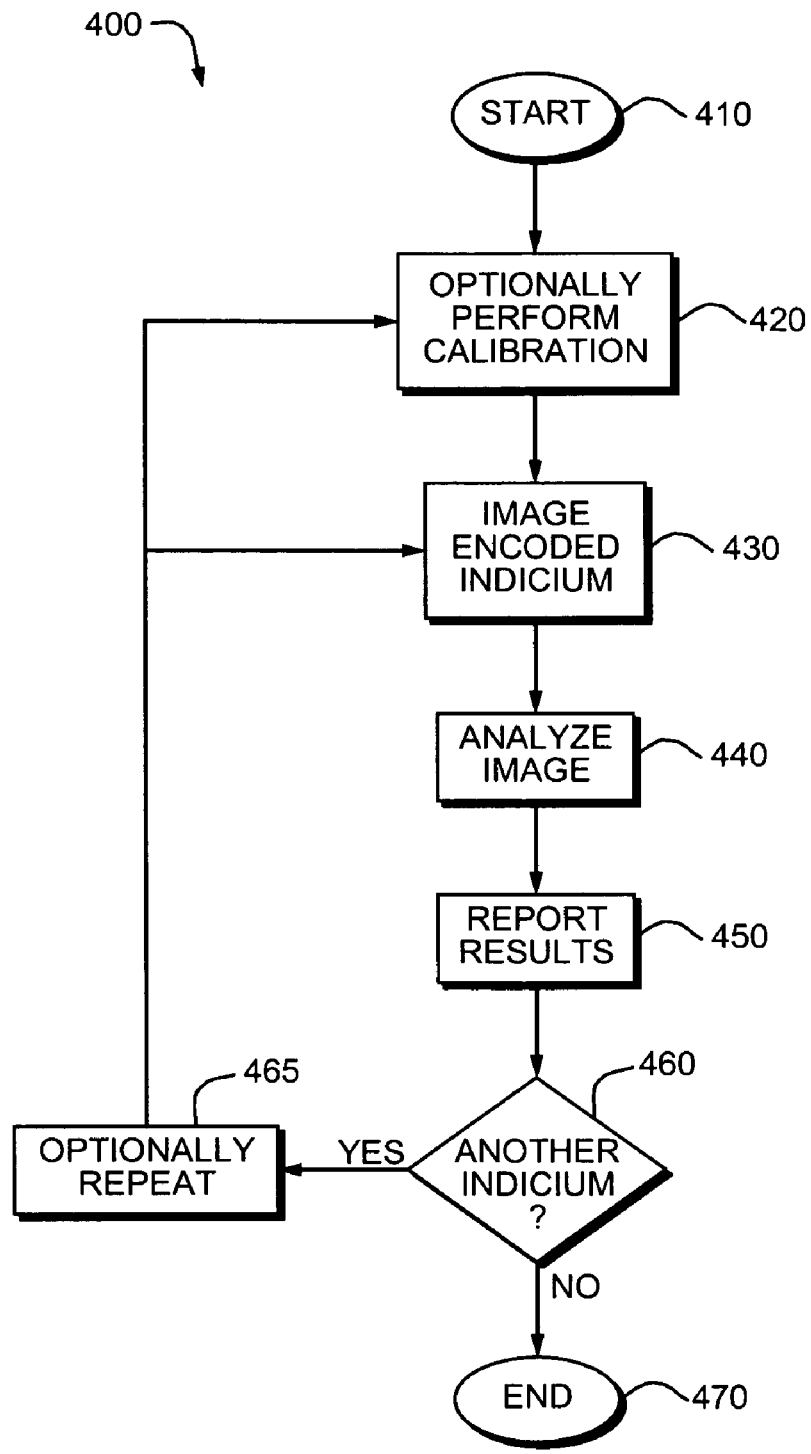
FIG. 4 is a flow diagram showing at a high level an illustrative embodiment of a process of measuring the quality of an encoded indicium, according to principles of the invention.

FIG. 4 is a flow diagram 400 showing at a high level an illustrative embodiment of a process of measuring the quality of an encoded indicium, according to principles of the invention. The flow diagram begins at oval 410, labeled "START," corresponding to setting up the hardware and initializing the software as necessary. The user then can optionally calibrate the self-aligning image quality verifier system, as indicated at box 420, labeled "OPTIONALLY PERFORM CALIBRATION." If the calibration is elected, the user places a calibration standard encoded indicium of a type corresponding to the intended target encoded indicium in the viewing area of the self-aligning image quality verifier system, and commands the system to take measurements. In general, if a calibration standard encoded indicium is used that is of acceptable quality, all of the images and associated parameters will return results that indicate acceptable quality for the calibration standard encoded indicium. The computer program of the system uses the measured image data obtained from the calibration standard encoded indicium to verify that the system is behaving appropriately, rather than to obtain calibration constants with which to later scale information obtained from an encoded indicium undergoing verification. The computer program of the system operates the apparatus in such a manner that the dynamic range observed by the imager when imaging the calibration standard encoded indicium is within suitable tolerances for a measurement. The measurement process for examining the quality of an encoded indicium includes the control of not only the distance and orientation between the encoded indicium and the imager, but also the illumination level within the apparatus as a consequence of the control of the at least one illumination source. Therefore, the apparatus and process can define a dynamic range or contrast level range for the calibration standard encoded indicium by controlling the illumination level. Operation to measure the quality of an encoded indicium undergoing testing can then be performed using the same illumination level and operating conditions. Accordingly, if the user has reason to believe that the system is behaving appropriately, the calibration step 420 can be safely omitted. Details of the parameters and results that can be expected will be discussed hereinbelow. The image information obtained from the calibration standard encoded indicium, when collected, is compared with absolute values that correspond to the substantially theoretical values that would be obtained for the measurement of a "perfect" calibration standard encoded indicium with a "perfect" verifier apparatus. In particular, the self-aligning image quality verifier system can be adjusted, for example by adjusting the illumination level, and adjusting operating parameters of the image sensor, to bring the observed image information from the calibration standard encoded indicium into close agreement with the theoretical values if the calibration standard encoded indicium has not been damaged or degraded. By comparison, other systems using ambient light need to calibrate their operating parameters to accommodate the then-incident level of illumination, which is subject to variation with time as a result of uncontrolled changes that may happen to occur, which can cause changes in both the absolute illumination level and the spectral content of the ambient illumination.

Upon completion of the elected calibration, or if the calibration is omitted, the user next places the intended target encoded indicium in the viewing area of the self-aligning image quality verifier system, and commands the system to take measurements, as indicated at box 430, labeled "IMAGE ENCODED INDICIUM." In response to a command to make a measurement, the self-aligning image quality verifier system activates the image sensor 310 to obtain at least one image of the encoded indicium 104 undergoing verification. As indicated at box 440, labeled "ANALYZE," the self-aligning image quality verifier system operates upon receipt of the command to measure according to the instructions provided in the computer program operating on the computer, so as to comprise an analysis module 320, and proceeds to analyze the at least one image of the encoded indicium undergoing verification to extract therefrom parameters that provide information regarding the quality of an encoded indicium of the type of the encoded indicium undergoing verification. As part of the analysis process, the analysis module 320 can store and retrieve from memory module 330 information relating both to the raw image data and to the results of analysis of the raw image data. The analysis module 320 compares data from the measurement of the encoded indicium undergoing verification with data corresponding to the theoretical values that would be obtained for the measurement of a "perfect" calibration standard encoded indicium with a "perfect" verifier apparatus. Since the apparatus is expected to be operating satisfactorily, and can be checked by performing an optional calibration step 420, it is expected that parameters observed for the encoded indicium undergoing verification that deviate from suitable values are attributable to flaws in the quality of the encoded indicium undergoing verification, and are so reported. The reported results are presented to the user, and can be alternatively and/or additionally recorded on machine-readable media for later use or for archival purposes, as indicated at box 450, labeled "REPORT RESULTS." The report can be in any convenient form, ranging from a simple aural or visual signal corresponding to acceptable or unacceptable results, to a complete, detailed description as explained at greater length hereinbelow.

The system then prompts the user to respond to the question as to whether any additional encoded indicia are available for verification analysis, as indicated by the diamond 460, labeled "ANOTHER INDICIUM?" If there are no further encoded indicia that are to be subjected to verification analysis, the process can be terminated, as indicated at oval 470, labeled "END." However, if there are additional indicia to be subjected to verification analysis, the process proceeds to box 465, labeled "OPTIONALLY REPEAT." The user then has the option as to whether a calibration step should be performed, as indicated by the arrow leading from box 465 to box 420, or whether the calibration step should be omitted, as indicated by the arrow leading from box 465 to box 430. Operation then continues according to the user's selection, as described hereinabove.

The operation of the self-aligning image quality verifier system will now be described using one embodiment that employs a personal computer. FIG. 5 shows an embodiment of the self-aligning image quality verifier system that employs a user interface screen 500 on a video display. The user interface screen 500 provides information to the user about the operation of the system as well as data about the quality of an encoded indicium undergoing verification. The user interface screen 500 comprises one or more display formats selected from a graphical user interface ("GUI"), text information, numerical information, visual indicators such as lights, and combinations thereof. In addition, audible signals may optionally be provided. The software used to operate the self-aligning image quality verifier system can be prepared using any convenient programming language, such as C, C++, Visual Basic, assembler, and/or other well-known programming languages, as well as combinations of computer modules and routines created using different computer programming languages. The operating system used by the computer that operates according to the commands encoded in the software can be any operating system, including such systems as Windows™ in any of its variants, Unix in any of its variants, Linux, any of the operating systems provided by Apple Computer, Inc., and other well-known operating systems.

Figure 5A:
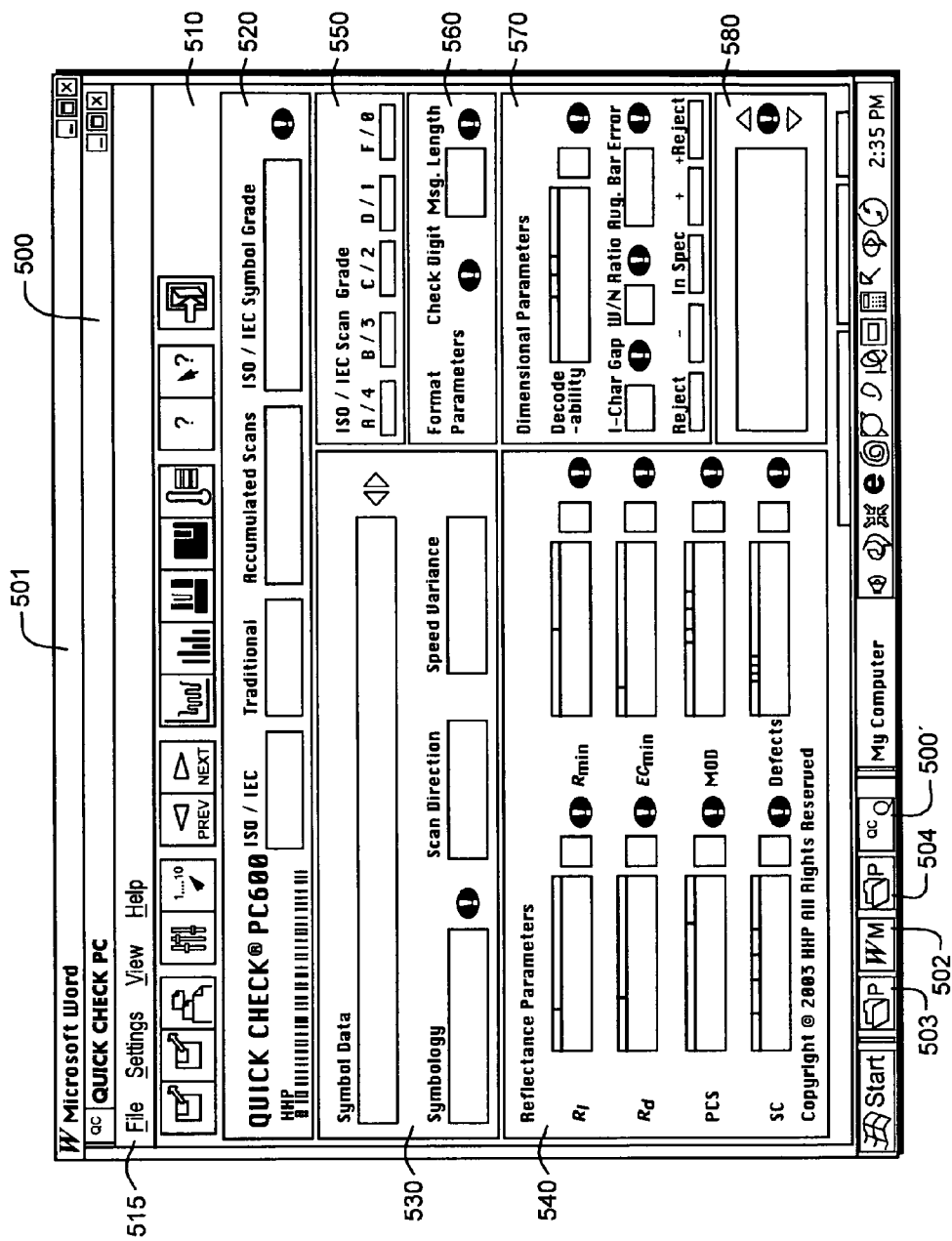
FIG. 5A shows an embodiment of the self-aligning image quality verifier system that employs a user interface screen on a video display.

As may be seen in FIG. 5A, in one embodiment the software is an active application operating on a personal computer in a Microsoft Windows™ environment, as indicated by the icon 500' at the bottom of the screen, which is displayed in the commonly observed "brighter" or "selected" status indicative of the current foreground application. The reader can observe that the environment also includes an instantiation of a word processing program, represented by the pane 501 in the background and the icon 502 on the bottom navigation bar, and various directories, represented by the file folder icons 503, 503': The user interface screen 500 comprises a variety of regions including: a toolbar 510, a "pull-down" menu bar 515, and a plurality of regions 520, 530, 540, 550, 560, 570 and 580, that will be discussed in more detail hereinbelow in turn. As may be observed in region 520, the embodiment shown in FIG. 5 is an application called "QUICK CHECK® PC600." QUICK CHECK® is a trademark of HHP, Inc. Various features of the application are protected by copyright as indicated by the notation "Copyright© 2003 HHP All Rights Reserved" that appears in the lower left hand corner of region 540.

Figure 6:
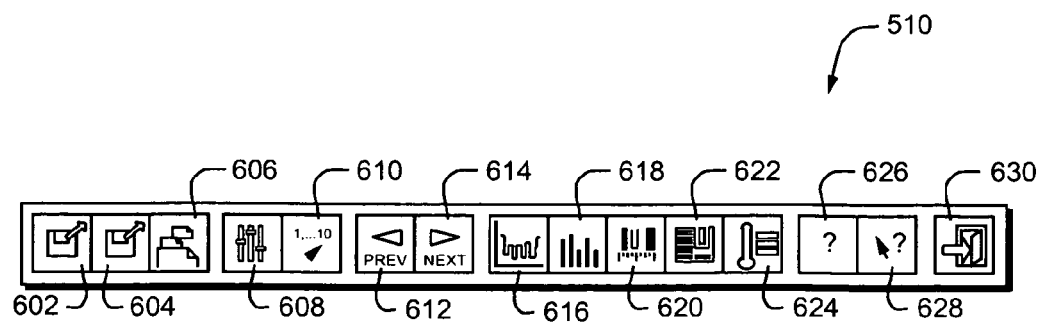
FIG. 6 is a screen shot that depicts an embodiment of the toolbar of FIG. 5A in greater detail.

FIG. 6 is a screen shot that depicts an embodiment of the toolbar 510 in greater detail. The toolbar 510 comprises GUI buttons 602 through 630. Button 602 when activated opens an existing data file, for example for review or for analysis. The data file is recorded on a machine-readable memory. Button 604 when activated saves an active file to a machine-readable memory. Button 606 when activated causes the printing of a report. Button 608 when activated opens a configuration menu, that allows a user to select a port for operation of the verifier apparatus, and that allows the user to configure report formats and contents, such as the menu depicted in FIG. 7, described in more detail below. Button 610 when activated opens a user interface that permits the user to select the number of scans to be used in evaluating an encoded indicium or a symbol, as is depicted in FIG. 8, described in more detail below.

Button 612 when activated causes the display of the previous scan in a group of scans of a symbol. Button 614 when activated displays the next scan in a group of scans. Button 616 when activated opens a scan reflectance profile display. Button 618 when activated opens an element width analysis display, elements being the components of the encoded indicium or symbol, for example for a black and white one dimensional bar code, the light and dark, or more reflective and less reflective stripes comprising the bar code. Button 620 when activated causes the user to be prompted for data to be used in calculating the X dimension of a scan. The X dimension of a bar code is the dimension of its narrowest element. Button 622 when activated presents a display for the user to make and edit notes for the group of scans. Button 624 when activated causes the real-time display of reflectance data from the verifier apparatus. Button 626 when activated presents to the user an index of topics for which on-line help is available. Button 628 when activated provides the user the ability to obtain on-line help by selecting a region of the display. Button 630 when activated causes the program to terminate. As used herein, the terms "when activated," "select" or "selected" indicate that a user, using a pointing device such as a mouse, designates an area or region of a display and then issues a command, for example by pressing a button on the mouse, which action is known colloquially to those of ordinary skill in the computer arts as "clicking" or "pressing" a button. Pointing devices other than mice, such as touch sensitive displays, light pens, joysticks, or haptic interfaces, may be used with equal effect. In some embodiments, commands can be issued by navigating using arrow keys on a keyboard or keypad, or by the use of function keys or other specially designated keys or combinations thereof.

Figure 7:
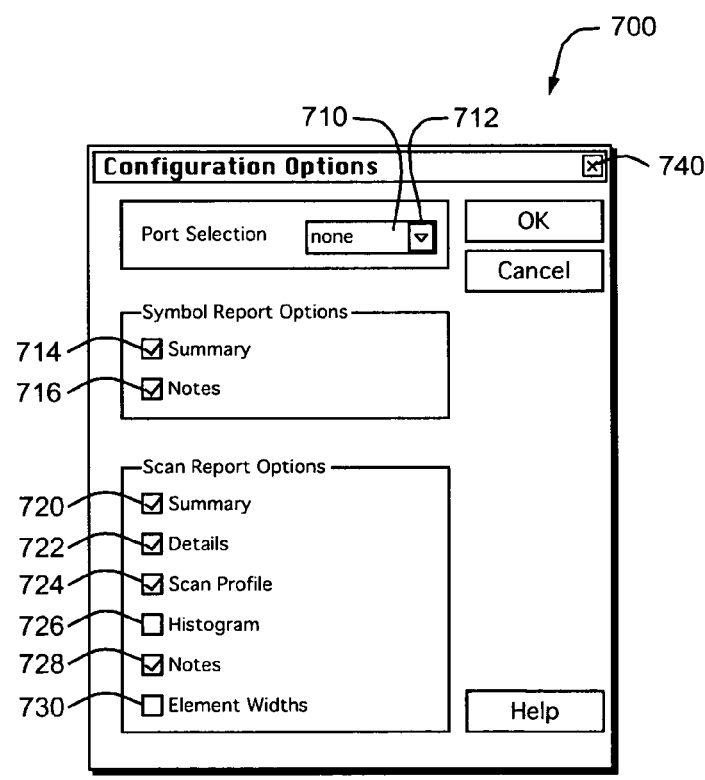
FIG. 7 shows a screen shot of an embodiment of a configuration menu according to principles of the invention.

FIG. 7 shows a screen shot of an embodiment of a configuration menu 700. A dialog box or window 710 is provided for the user to designate a communication port, such as a serial port selected from the group of COM1, COM2, COM3, and COM4, which are conventional serial ports available in a conventional personal computer. The dialog box or window 710 as shown has no port selected. The dialog box or window 710 includes the conventional "drop-down window" selection mechanism indicated by the arrow button 712. The user is also provided with selections regarding symbol reports, which can include either or both of summary and notes components. The user selects the desired format by marking or unmarking "check boxes" 714 and 716, respectively, for the summary and note components. The user is also provided with selections regarding scan report options. These choices are also selected by marking or unmarking check boxes 720, 722, 724, 726, 728, and 730, respectively, to select a summary, report details, a scan profile, a histogram, notes, and elements widths. In the embodiment shown in FIG. 7, which is in the format well-known to users of programs compatible with either Windows™ or Apple™ computer operating systems, there are provided buttons to permit a user to select and apply his or her choices (the "OK" button), a button to exit the selection without making choices (the "Cancel" button), a "Help" button that opens an on-line help window, and the "close window" button 740, which when activated closes the configuration menu 700. The "OK," "Cancel," "Help," and "close window" buttons are ubiquitous, and will not be mentioned further in explaining the invention or its various embodiments in software. The configuration menu 700 can be caused to appear as an overlay on an existing display screen, or as a separate screen, without affecting the operation of the embodiment of the invention. Other screens, such as configuration, help, or report screens, as described herein, can also be made to appear as overlays or as separate screens, simply by making programming selections, which selections may in some embodiments be left to the discretion and/or preference of the user.

Figure 8:
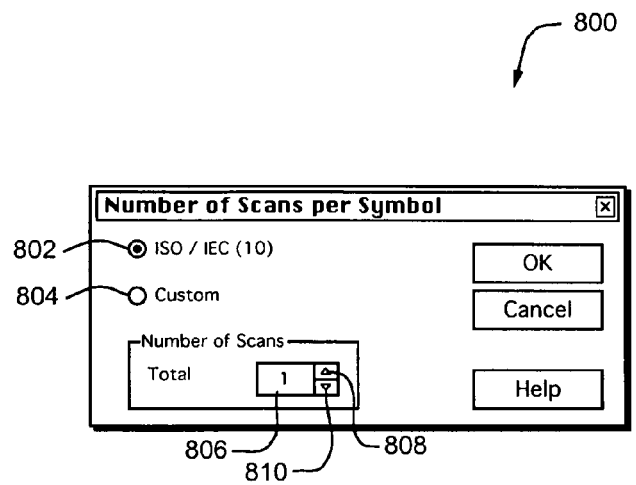
FIG. 8 is a screen shot of an embodiment of a menu that permits a user to select the number of scans to be taken per symbol, according to principles of the invention.

FIG. 8 is a screen shot of an embodiment of a menu 800 that permits a user to select the number of scans to be taken per symbol. The menu 800 includes two "radio buttons" 802 and 804. Radio button 802 is selected as a default, and provides 10 scans per symbol or encoded indicium according to the conventional ISO/IEC standard. Dialog box 806 is "grayed out" when radio button 802 is selected, in the conventional indication that the number contained within dialog box 806 is not meaningful. Radio button 804 when selected allows the user to customize the number of scans. When radio button 804 is selected, dialog box 806 is white, and the number contained therein is the number of scans to be taken per symbol. The number can be changed by highlighting the dialog box 806 and entering numbers from a keypad or keyboard, or alternatively, by selecting, as required, arrow 808 to increase the number or arrow 810 to decrease the number. When the user is satisfied with the selections, the "OK" button when activated applies the then-current selections.

FIG. 5A depicts a "pull-down" menu bar 515, having a number of menu headings, including "File," "Settings," "View," and "Help." The headings, when activated, cause a pull-down menu of selections to appear. For example, the "File" heading, when activated, causes menu items titled "Open (a file)," "Save (the current file)," "Print (the current file or display)" and "Exit" to appear. These are equivalent to the functionality provided by buttons 602, 604, 606 and 630, respectively. The "Settings" heading, when activated, causes menu items titled "Configuration . . . " and "Scans per Symbol" to appear, which are equivalent to the functionality provided by buttons 608 and 610, respectively. The "View" heading, when activated, causes menu items titled "Previous scan," "Next scan," "Scan profile, "Element graph," "Calculate X," "Notes," and "Reflectometer" to appear. These are equivalent to the functionality provided by buttons 61, 618, 620, 622, and 624, respectively. The "Help" heading, when activated, causes menu items entitled "Help," "Using help," and "About" to appear. The "Help" menu item is equivalent in functionality to button 626. The "Using help" menu item when activated opens a help window that tells the inexperienced computer user how to use help. The "About" menu item when activated displays information about the program, such as version number, for use when a user requests assistance, for example, from the vendor.

Figure 9:
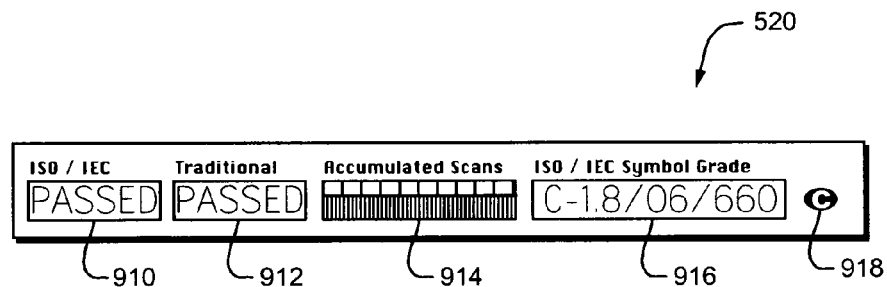
FIG. 9 is a screen shot of a portion of the user interface screen of FIG. 5A that shows overall symbol or encoded indicium grade results, according to principles of the invention.

FIG. 9 is a screen shot of region 520 in greater detail. In this embodiment, region 520 shows overall symbol or encoded indicium grade results. The grade results are displayed after the selected number of scans for the symbol has been collected, as defined according to the user's selections. Traditionally, there is no particular number of scans that are required to be taken to assign a symbol grade; therefore, the number used could be as small as one scan. However, according industry standards, such as ISO/IEC, the number of scans required is 10 scans per symbol. The result in box 910 is a result using the industry standard ISO/IEC procedures, in which an indication of "PASS" or "FAIL" appears as each scan is taken. According to another manner of grading scans, box 912 displays a result for the symbol based on a traditional scan grade, in which each scan is graded "PASS" or "FAIL" individually. Box 914 is a bar graph that shows the progress of the measurement as each expected scan is completed. The progress bar can also be used to indicate which scan of a sequence of scans is being examined, for example when using the buttons 612, 614 to scroll through a series of scans. Box 916 provides an alphanumeric message showing running symbol grades as each scan is collected, and a final grade when the set of scans is complete and the last scan is displayed. The button 918 displays a letter grade assigned to the symbol undergoing verification, which letter is a letter selected from the group consisting of "A," "B," "C," "D," and "F."

Figure 10:
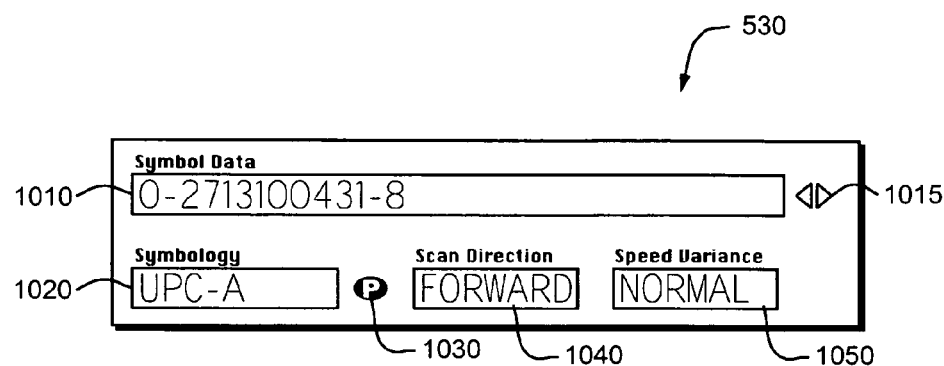
FIG. 10 is a screen shot of an embodiment of a region of the user interface screen that presents general data to a user.

FIG. 10 is a screen shot of an embodiment of region 530, which presents general data to a user. Box 1010 includes information comprising data encoded in an encoded indicium or symbol. In the embodiment shown in FIG. 10, the information corresponding to a one dimensional bar code that represents the sequence 0-2713100431-8 is presented. This information includes data and control characters. The right and left arrows 1015 can be used to scroll through long strings of data, for example data too long to fit completely within box 1010. In box 1020, the bar code symbology is identified as "UPC-A," a type of Universal Product Code. Indicator 1030 provides a "P" or "F" indication, depending on whether the symbology is decoded correctly. Box 1040 provides information about the scan direction as "FORWARD" or "REVERSE." Box 1050 indicates a degree of variation in scan speed as one of "NORMAL," "MARGINAL" or "HIGH." This display box can be disabled at the user's preference, and is useful in permitting the user to assess how scans are performed, if they are performed manually.

Figure 11:
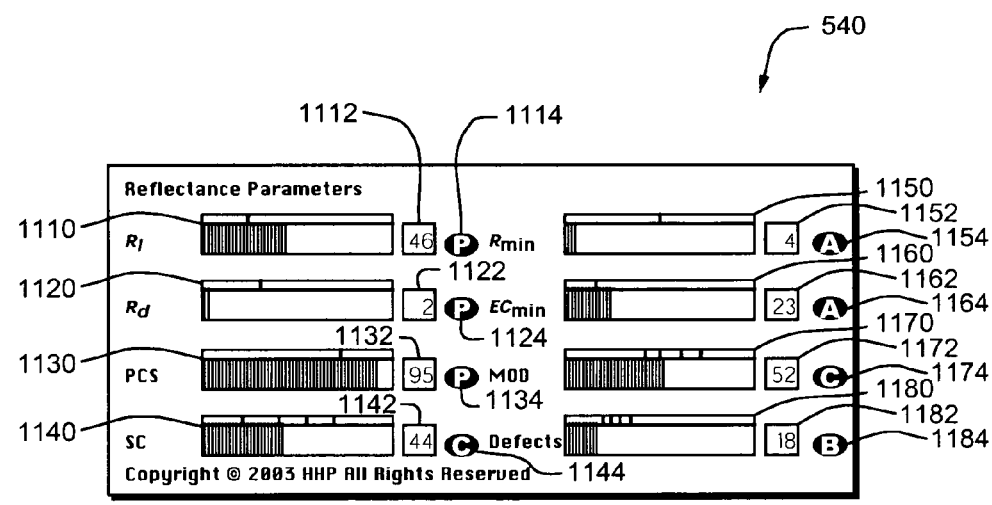
FIG. 11 is a screen shot of an embodiment of region of FIG. 5A that displays parameters relating to reflectance properties of the symbol being scanned or under verification.

FIG. 11 is a screen shot of an embodiment of region 540, which displays parameters relating to reflectance properties of the symbol being scanned or under verification. In one embodiment, the parameters relate to contrast measurements. For each of N=1 through 8, box 11N0 is a bar graph scaled from 0% to 100% (0% is the leftmost end of the bar), in which the extent of a bar indicates a numeric value. Above the bar 11N0 is a scale of ticks, which can be presented in colors, such as red (to indicate failure) or green (to indicate success or pass). A box 11N2 provides a numerical reading of the value of the bar. In addition, in indicator 11N4, a grade in either the range A, B, C, D or F, or a Pass/Fail (P/F) grade is presented, corresponding to the value of the bar in box 11N0 and box 11N2. The eight parameters are as follows: For N=1 (e.g., boxes 1110 and 1112, and indicator 1114), R(L) or light reflectance, is a pass for reflectances equal to or above 25%. For N=2, the parameter R(D) or dark reflectance is a pass for reflectances equal to or below 30%. For N=3, the parameter PCS, or Print Contrast Signal, is measured as the ratio of the difference of space and bar reflectance to space reflectance, or PCS=(R(L)−R(D))/R(L). The PCS grade is PASS when PCS is at or above 75%; otherwise the grade is FAIL. PCS is a traditional comparison of bar and space reflectance. For N=4, the parameter SC (or Symbol Contrast) is a measure of the difference between the maximum and minimum reflectances in a scan profile. The assignment of ISO/IEC grade to symbol contrast value is given as follows: A represents contrast ≧70%, B represents contrast ≧55%, C represents contrast ≧40%, D represents contrast ≧20%, and F represents contrast ≦20%. For N=5, the parameter Rmin/Rmax tests the ratio of a scan profile's minimum reflectance to maximum reflectance. The ISO/IEC grade is A if the parameter is at or below 50%; otherwise the grade is F. For N=6, the parameter $EC_{min}$, or Minimum Edge Contrast, is the minimum of all edge contrasts in a scan profile. Edge contrast is the difference between the reflectance of a space (or quiet zone) and its adjacent bar. The ISO/IEC grade is A if $EC_{min}$ is at or above 15%; otherwise the grade is F. For N=7, the parameter MOD, or Modulation, is the ratio of minimum edge contrast to symbol contrast in a scan profile. The modulation value is lowered (along with its grade) when a scanner detects narrow elements to have lower reflectance than wider elements and/or detects spaces to be thinner than bars of the same printed width. The ISO/IEC grade for modulation is as follows: A represents modulation ≧70%, B represents modulation ≧60%, C represents modulation ≧50%, D represents modulation ≧40%, and F represents modulation <40%. Finally, for N=8, the parameter Defects represents irregularities found in a scan profile. Defects are often caused by voids or spots in the bars or spaces (including quiet zones). Within each element, the difference between its maximum reflectance peak and lowest reflectance valley is called the element reflectance nonuniformity. The parameter Defects measures the ratio of the maximum element reflectance nonuniformity in a scan profile to the symbol contrast. The ISO/IEC grade as follows: A represents defects ≦15%, B represents defects ≦20%, C represents defects ≦25%, D represents defects ≦30%, and F represents defects >30%.

Figure 12:
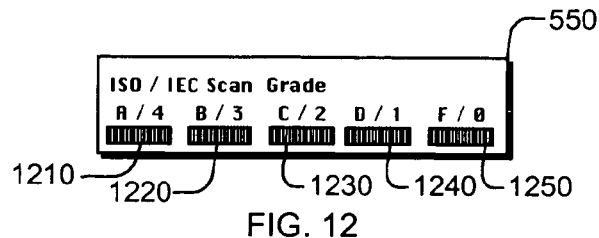
FIG. 12 is a screen shot depicting a region of FIG. 5A that displays the ISO/IEC scan grade attained by scanning an encoded indicium.

FIG. 12 is a screen shot depicting region 550, which displays the ISO/IEC scan grade attained by scanning an encoded indicium. The scan grade is shown graphically. Each grade is shown by a bar 1210, 1220, 1230, 1240, 1250. The grade is presented as a letter grade and as a numerical grade, in which A=4, B=3, C=2, D=1 and F=0. Two colors are used, green and red, to indicate passing and failing respectively. Each color can be at low or high intensity. High intensity is used to show the grade that the scan achieved. For example, in the graphic, the scan grade is B (marked by the high intensity). Low intensity indicates whether the grade itself is passing or failing. For example, in the graphic above the minimum passing grade is C, (i.e., distinguished by the low intensity switch from green to red). The B grade is passing because it is shown as green.

Figure 13:
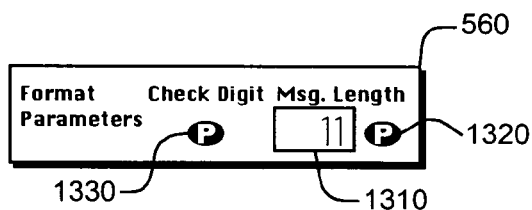
FIG. 13 is a screen shot of a region of FIG. 5A that displays the format results attained by scanning an encoded indicium.

FIG. 13 is a screen shot of region 560, which displays the format results. Message length is displayed in box 1310. Message length is the number of data characters contained in a bar code. The number of message characters need not equal the number of symbol characters (for instance, when Code 128 encodes two digits per symbol character). In message length calculations, any check characters, start/stop characters, and function characters are not included. Message length is usually specified by application. When applicable, this parameter is graded as Pass or Fail, as indicated by indicator 1320. In one embodiment, Quick Check® PC allows an optional programmable fixed message length requirement. The check character (also called check digit) is graded as Pass or Fail, as indicated by indicator 1330, when selected or required by the symbology. A check character is a member of a bar code message that mathematically tests the validity of the decoded data. Check characters can be specified as optional or required by a symbology specification. In addition, bar code labels can have additional check digits specified by an application. In one embodiment, Quick Check® PC allows programmable selection of optional check characters for Codabar, Interleaved 2-of-5, and Code 39. The calculation method for each is found in the respective symbology specification.

Figure 14:
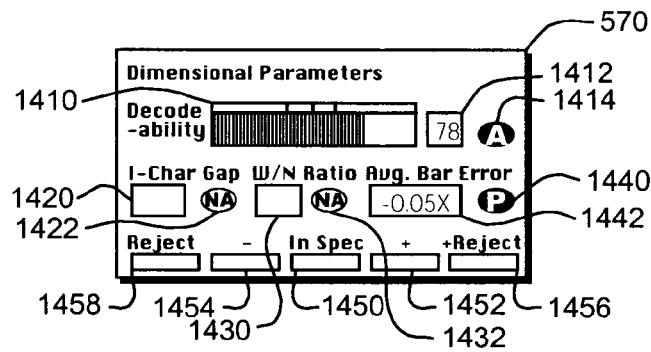
FIG. 14 is a screen shot showing a region of FIG. 5A that displays various dimensional parameters associated with an encoded indicium undergoing verification.

FIG. 14 is a screen shot showing region 570 in greater detail. The region 570 displays various dimensional parameters associated with an encoded indicium undergoing verification. The parameters are computed based on relative bar/space width and edge position measurements. The parameters include decodability (1410, 1412, 1414), average bar error (1420, 1422), wide to narrow ratio (1430, 1432), and intercharacter gap (14140, 1442). The overall grade of the bar space tolerances or average bar dimensional parameters is given as In Spec (1450), +(1452), −(1454), +Reject (1456), and −Reject (1458).

The decodability parameter is a measure of printing accuracy of a symbol relative to the appropriate reference decode algorithm. It is the margin of error available to a bar code reader after the print process (and anything else that may occur before the bar code is read). Decodability calculates this margin as a fraction of tolerance available. The calculation process is generally unique to a symbology and takes into account the unique reading and printing aspects of that symbology. The assignment of ISO/IEC grade to decodability value is as follows: A represents decodability ≧62%, B represents decodability ≧50%, C represents decodability ≧37%, D represents decodability ≧25%, and F represents decodability <25%. The decodability parameter is presented in this embodiment as a bar graph 1410, a numerical value in box 1420, and as a letter grade in indicator 1414.

In two-width symbologies, wide to narrow ratio (or W/N ratio) is the comparison of average wide element width to average narrow element width expressed as a ratio. Intercharacter gaps are never included. N usually represents W/N ratio in calculations or equations. W/N ratio is usually specified in the range of 1.8 to 3.4. The reference decoding algorithm can break down if a smaller range is specified, while higher ratios are usually discounted by practical considerations. When applicable, this parameter grade is Pass when N is found in specification and LO or HI otherwise. Quick Check® PC allows an optional programmable W/N ratio requirement. The value of N is displayed in box 1420, and the parameter grade is displayed in indicator 1422, as appropriate.

The intercharacter gap is the space that separates two adjacent characters in a discreet symbology. Symbology or application, or both may specify any size requirements. A value for the intercharacter gap is displayed in box 1420, and a grade, as appropriate, is displayed in indicator 1422.

The average bar error is an amount that bar widths differ from nominal width on average in a symbol. This number is expressed as a fraction of X dimension in box 1440. A positive value indicates average bar growth and a negative value indicates bar shrinkage. Average bar error is not graded directly, but is used to calculate what fraction of a defined bar tolerance is consumed by the printing process. This traditional bar tolerance calculation differs by symbology, and in the case of U.P.C./EAN differs also by the magnification factor at which the symbol is printed. Generally a smaller X dimension yields a smaller tolerance. The tolerance ranges may be interpreted as shown in Table I, where the percentages apply to growth or shrinkage, depending if the bar error is positive or negative. Bar error grade is LO (negative value) or HI (positive value) when out of tolerance and Pass otherwise (whether marginal or not). Bar tolerance is shown graphically using a scale of five "lights" on the display (i.e., 1450, 1452, 1454, 1456, and 1458). The left side of the scale indicates a negative result and the right side indicates a positive result. In one embodiment, as indicated in the table, high-intensity colors are used to indicate the tolerance values.

TABLE I

| Grade | Result | Color Indication |
|---|---|---|
| <25% | OK, close to nominal | Green |
| 25%-50% | OK, Minimal error | Green + Yellow |
| 50%-75% | OK, In tolerance | Yellow |
| 75%-100% | OK, Marginal | Yellow + Red |
| >100% | Fail, Out of tolerance | Red |

Figure 15:
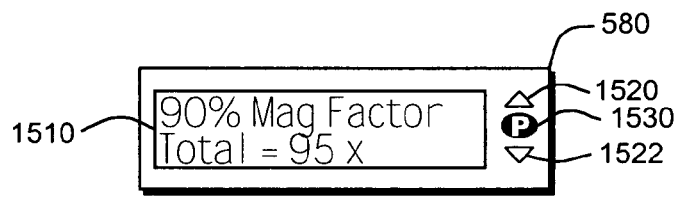
FIG. 15 is a screen shot of a region of FIG. 5A that shows certain informative and graded results as a list of text messages.

FIG. 15 is a screen shot of region 580, which section of the display shows certain informative and graded results as a list of text messages in box 1510. These format and dimensional results are in a list format to save on the amount of custom graphic areas that would otherwise be necessary. The messages are scrolled using the up and down arrow buttons 1520, 1522. The indicator, which in one embodiment is a grade bubble, indicates that a failing result is included in the list if red or if displaying the letter F, or both. Table II below lists messages that in one embodiment are provided as necessary, and their meanings.

TABLE II

| Message Displayed: | Meaning of the Message: |
|---|---|
| BAD # System | U.P.C.-E1 symbol was scanned |
| BAD Char Seq. | Error in Code 128 mode character placement |
| RefDecode FAILS | Reference decode algorithm failed |
| GlobalThr FAILS | Global threshold conformance failed |
| SHORT Left QZ | Left quiet zone failed minimum requirement |
| SHORT Right QZ | Right quiet zone failed minimum requirement |
| BAD Left Guard | U.P.C./EAN left guard pattern failed conformance test |
| BAD CenterGuard | U.P.C./EAN center guard pattern failed conformance test |
| BAD Right Guard | U.P.C./EAN right guard pattern failed conformance test |
| UCC/EAN-128 Errors | UCC/EAN-128 format errors, if any, are listed |
| UCC/EAN-128 A.I.s | UCC/EAN-128 application identifier descriptions, if applicable, are listed |
| BAD AddendumChk | U.P.C./EAN addendum failed parity check |
| 100% Mag Factor | U.P.C./EAN magnification factor is reported |
| X = 0.0001 in | X dimension, if measured, is reported |
| Total = 99 X | Symbol width in terms of X dimension is reported if X dimension is not calculated |
| Quiet Zones OK | Displayed if both quiet zone tests passed |
| Ref.Decode OK | Displayed if reference decode passed |

The global threshold is the reflectance level that is the midpoint between a scan profile's maximum and minimum reflectance. It is defined that all edges of elements shall traverse the global threshold; thus each space's reflectance value is above and each bar's reflectance value is below the global threshold. The point on a scan profile that intersects the midpoint between adjacent bar and space reflectances determines edges. The global threshold grade is A if all elements conform to this test; otherwise the grade is F.

Each symbology has an associated reference decode algorithm, defined in a symbology specification or a particular application, or perhaps both. This algorithm is used to decode the symbol using the elements defined by those edges that conform to the global threshold test. If the reference decode is successfully completed, then this grade is A; otherwise this grade is F. Note that if the scan profile fails global threshold, then reference decode automatically fails since not all elements could be determined.

Quiet zones, also called light margins, are areas of space at the ends of a bar code. By separating bar codes from other surrounding markings, quiet zones help increase reading security. Symbology or application, or both can specify quiet zone requirements. Left and right quiet zones are separately graded as Pass or Fail. The grade reported is OK or F.

Symbol Total is the width of the bar code symbol, excluding quiet zones, expressed as a multiple of X dimension. With U.P.C./EAN symbols, this width is excluding any addendum. Symbol total facilitates calculation of the X dimension. If the physical width of the symbol is known (relatively easy to measure with a ruler), symbol width divided by symbol total yields the X dimension in the units in which the width was measured. In one embodiment, Quick Check® PC has a dialog window which does the calculation given the physical symbol width. This parameter is not graded but is reported for informational purposes only.

Magnification Factor is the amount of uniform scaling applied to a symbol to enlarge or reduce that symbol from nominal size (where nominal is usually 100%). The U.P.C. symbology, which is traditionally specified by physical dimensions, is a notable example where magnification factor applies. Bar tolerance calculations for U.P.C./EAN depends on the magnification at which the symbol is printed. Magnification factor must be selected manually in one embodiment of Quick Check® PC.

Figure 5B:
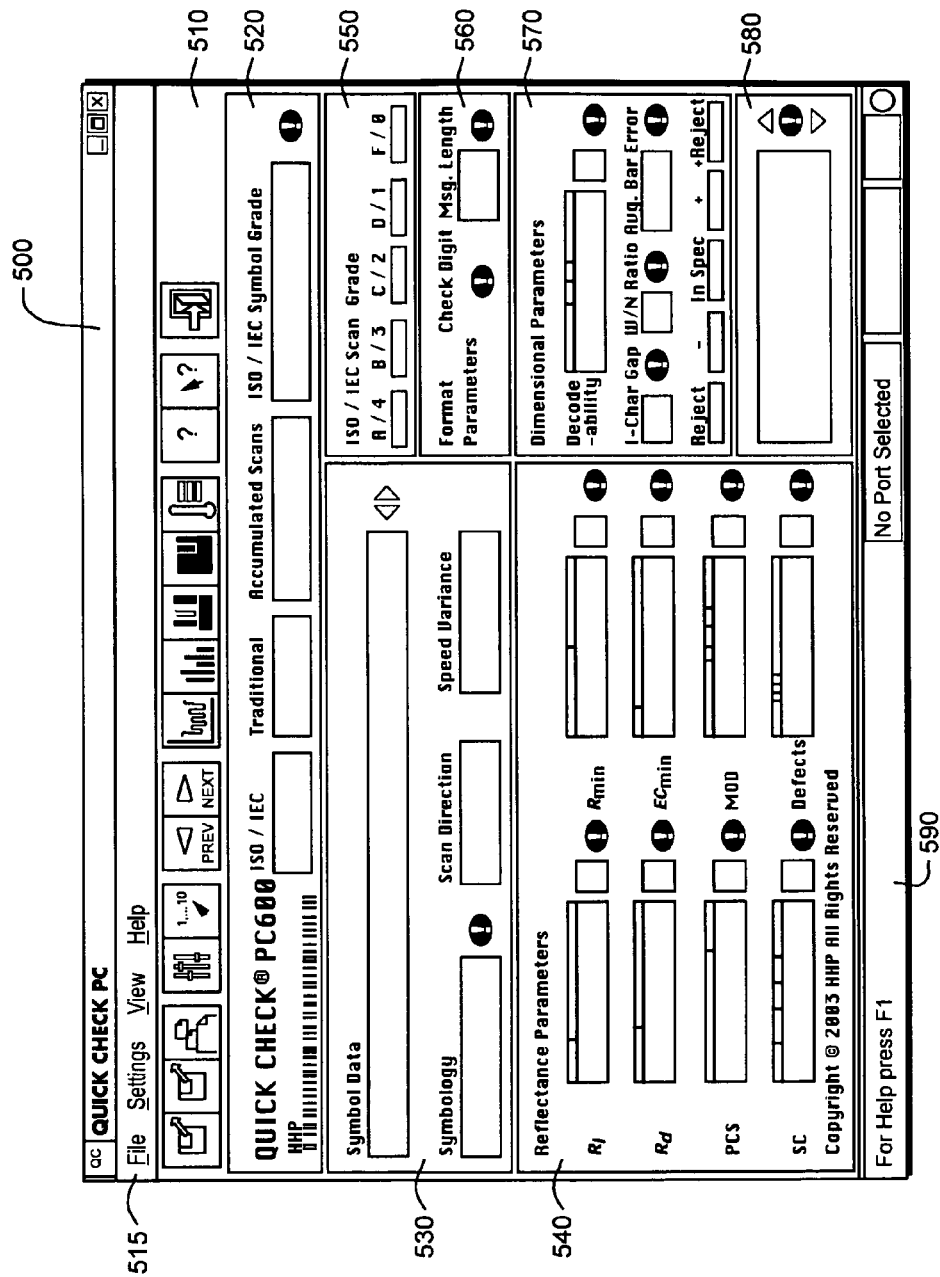
FIG. 5B shows another view of an embodiment of the self-aligning image quality verifier system that employs a user interface screen on a video display.
Figure 16:
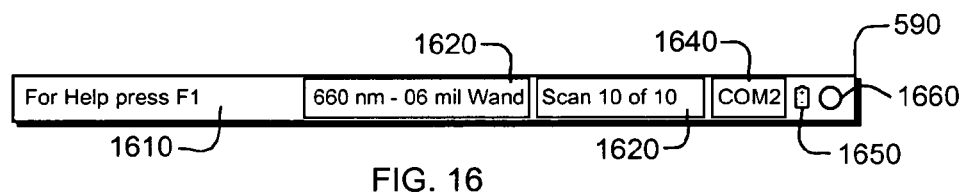
FIG. 16 is a screen shot of a region of FIG. 5B comprising a status bar.

FIG. 5B shows an embodiment of the self-aligning image quality verifier system that employs a user interface screen 500 on a video display. In addition to a toolbar 510, a "pull-down" menu bar 515, and a plurality of regions 520, 530, 540, 550, 560, 570 and 580, FIG. 5B also depicts a region 590. Region 590 is a status bar that displays the then current program conditions. FIG. 16 is a screen shot of the region 590 status bar. The status bar 590 is divided into different message areas. Area 1610 displays general status and help messages. Area 1620 displays information about the scanner type that is being used. In one embodiment, area 1620 shows aperture and illumination wavelength of the detected pen or mouse wand. If the scanner is removed, the message shown is "Scanner Missing!" If the interface box is off or disconnected, the message shown is "No Connection!" If no serial port is selected, the message shown is "No Port Selected!" In area 1630 there is shown the ordinal number of the scan that is currently displayed out of the expected number of scans per symbol. In area 1640, there is an indication of the selected serial port. If the box is empty, no port has been selected. GUI 1650 is an icon in the shape of a battery. This icon appears when low battery level is detected, warning that the interface may shut down. In the event of such shutdown, no PC data is lost. The icon is not shown normally. GUI 1660 is a hardware status indicator that acts like an LED, using color to indicate various interface status conditions. GUI 1660 is gray when interface is off or port selection does not match the actual connection. GUI 1660 is red when the interface is detected but not active, such as when the scanner is removed or Quick Check® PC has paused operation. GUI 1660 is green when the interface is active and ready to scan.

Those of ordinary skill will recognize that many functions of electrical and electronic apparatus can be implemented in hardware (for example, hard-wired logic), in software (for example, logic encoded in a program operating on a general purpose processor), and in firmware (for example, logic encoded in a non-volatile memory that is invoked for operation on a processor as required). The present invention contemplates the substitution of one implementation of hardware, firmware and software for another implementation of the equivalent functionality using a different one of hardware, firmware and software. To the extent that an implementation can be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function, is contemplated herein.

While the present invention has been explained with reference to the structure disclosed herein, it is not confined to the details set forth and this invention is intended to cover any modifications and changes as may come within the scope of the following claims.

What is claimed is:

1. A self-aligning structure for use in measuring the quality of an encoded indicium, comprising:
   a hollow chamber comprising:
      a first surface defining a first aperture, the first aperture representing a viewing area of an imager used to obtain an image of the encoded indicium;
      a second surface defining a second aperture, the second aperture configured to support the imager in a position to obtain the image of the encoded indicium;
      at least one source of illumination situated within the hollow chamber, the at least one source of illumination configured to illuminate the encoded indicium; and
      an illumination control operatively coupled to control the at least one source of illumination;
   the hollow chamber configured to be positioned adjacent the encoded indicium such that, when the encoded indicium is positioned within the viewing area, when an imager is supported in the second aperture, and when the at least one illumination source is properly controlled, the structure is self-aligned and the imager can obtain at least one image of the encoded indicium from which image the quality of the encoded indicium can be measured, wherein the hollow chamber is constructed in a plurality of mating sections, a first section comprising the first surface defining the first aperture representing the viewing area of the imager of the encoded indicium, and a second section comprising the second surface defining the second aperture configured to support the imager in the position to obtain the image of the encoded indicium.

2. The self-aligning structure according to claim 1, wherein the hollow chamber is configured to exclude extraneous illumination when the imager is present and the hollow chamber is positioned adjacent the encoded indicium.

3. The self-aligning structure according to claim 1, wherein the hollow chamber is configured to support the imager in a defined position relative to the encoded indicium.

4. The self-aligning structure according to claim 3, wherein the defined position comprises a defined distance.

5. The self-aligning structure according to claim 3, wherein the defined position comprises a defined angle.

6. The self-aligning structure according to claim 1, wherein said hollow chamber is constructed so that said second section is adapted to be disposed on top of said first section.

7. The self-aligning structure according to claim 1, wherein the hollow chamber is configured to remain mechanically stable when the imager is positioned within the second aperture.

8. The self-aligning structure according to claim 1, wherein the hollow chamber further comprises an optical sensor configured to receive illumination from the at least one source of illumination for the purpose of confirming an illumination characteristic provided by the at least one source of illumination.

9. The self-aligning structure according to claim 8, wherein the illumination characteristic provided by the at least one source of illumination is a characteristic selected from an illumination intensity at a selected time and an illumination wavelength.

10. A self-aligning structure for use in measuring the quality of an encoded indicium, comprising:
   a hollow chamber comprising:
      a first surface defining a first aperture, the first aperture representing a viewing area of an imager used to obtain an image of the encoded indicium;
      a second surface defining a second aperture, the second aperture configured to support the imager in a position to obtain the image of the encoded indicium;
      at least one source of illumination situated within the hollow chamber, the at least one source of illumination configured to illuminate the encoded indicium; and
      an illumination control operatively coupled to control the at least one source of illumination;
   the hollow chamber configured to be positioned adjacent the encoded indicium such that, when the encoded indicium is positioned within the viewing area, when an imager is supported in the second aperture, and when the at least one illumination source is properly controlled, the structure is self-aligned and the imager can obtain at least one image of the encoded indicium from which image the quality of the encoded indicium can be measured, wherein said self-aligning structure is configured to receive illumination from the at least one source of illumination for the purpose of confirming an illumination characteristic provided by the at least one source of illumination.

11. The self-aligning structure according to claim 10, wherein the illumination characteristic provided by the at least one source of illumination is a characteristic selected from an illumination intensity at a selected time and an illumination wavelength.

12. The self-aligning structure according to claim 10, wherein the illumination characteristic provided by the at least one source of illumination is an illumination intensity.

13. The self-aligning structure according to claim 10, wherein the illumination characteristic provided by the at least one source of illumination is an illumination wavelength.

14. The self-aligning structure according to claim 10, wherein the self-aligning sensor includes an optical sensor separate from said imager for receiving illumination for the at least one source of illumination for the purpose of confirming an illumination characteristic provided by the at least one source of illumination.

15. An image quality verifier system useful for verifying the quality of an encoded indicium, the system comprising:
   a first imager for obtaining an image of said encoded indicium;
   a second imager for obtaining an image of said encoded indicium;

at least one source of illumination for illuminating said encoded indicium; and a structure comprising a hollow chamber, the hollow chamber configured to exclude extraneous illumination and comprising a first surface defining a first aperture, the first aperture representing a viewing area of the imager, wherein said structure is configured to support, at any given time, one of said first imager and said second imager at a position above said encoded indicium, wherein said structure is further configured so that when said first imager is supported by said structure, said first imager is in such position to obtain an image of an indicium within said viewing area, and wherein said structure is further configured so that when said second imager is supported by said structure said second imager is in such position to obtain an image of an indicium within said viewing area.

16. The image quality verifier system of claim 15, wherein said first imager and said second imager have different working distances.

17. The image quality verifier system of claim 15, wherein said structure comprising said hollow chamber includes a hollow chamber having a first section defining said first aperture and an interchangeable second section comprising either a first second section or an alternate section, the system being configured so that said first second section is mated to said first section for supporting said first imager, the system further being configured so that said alternate second section is mated to said first section for supporting said second imager.

18. The image quality verifier system of claim 15, wherein said hollow chamber of said structure supports one of said first imager or said second imager.

19. The image quality verifier system of claim 15, wherein each of said first and second imagers includes an illumination source so that said source of illumination of said system for illuminating said encoded indicium can be provided by said first or second imagers, whichever is supported by said structure.

20. A self-aligning structure for use in measuring the quality of an encoded indicium, comprising:
a hollow chamber comprising:
a first surface defining a first aperture, the first aperture representing a viewing area of an imager used to obtain an image of the encoded indicium;
a second surface defining a second aperture, the second aperture configured to support the imager in a position above said encoded indicium to obtain the image of the encoded indicium,
wherein said hollow chamber is provided in a form having first and second mating sections, the hollow chamber being configured so that said first surface defining said first aperture is included on said first mating section and said second surface defining said second aperture is included on said second mating section.

21. The self-aligning structure of claim 20, wherein said structure is provided in a form including an alternate first section of said hollow chamber, and wherein said hollow chamber is configured so that said alternate first section can replace said first section.

22. The self-aligning structure of claim 20, wherein said structure is provided in a form including an alternate first section of said hollow chamber, wherein said hollow chamber is configured so that said alternate first section can replace said first section, and wherein the alternate first section has a viewing area defined for a different type of encoded indicium than said first section.

23. The self-aligning structure of claim 20, wherein said structure is provided in a form including an alternate second section of said hollow chamber, and wherein said hollow chamber is configured so that said alternate second section can replace said second section.

24. The self-aligning structure of claim 20, wherein said structure is provided in a form including an alternate second section of said hollow chamber, wherein said hollow chamber is configured so that said alternate second section can replace said second section, and wherein said alternate second section is configured to support a different imager than said second section.

25. An image quality verifier system useful for verifying the quality of an encoded indicium, comprising:
an imager for obtaining an image of the encoded indicium;
a source of illumination for illuminating said encoded indicium; and
a hollow chamber configured to exclude extraneous illumination and comprising a first surface defining a first aperture, the first aperture representing a viewing area of the imager, wherein said system is configured so that said imager is positioned at a position above said encoded indicia,
wherein said system is provided in a form such that a section of said hollow chamber including said first surface can be removed from a remainder of said hollow chamber and replaced with an alternate hollow chamber section.

26. The image quality verifier system of claim 25, wherein said alternate hollow chamber section is configured for use with a different type of encoded indicium than said section of hollow chamber including said first surface.

27. An image quality verifier system useful for verifying the quality of an encoded indicium, comprising:
an imager for obtaining an image of the encoded indicium, the imager comprising a sensor including one of (i) a linear array of photosensitive elements or (ii) two dimensional array of photosensitive element;
a source of illumination for illuminating said encoded indicium;
a hollow chamber configured to exclude extraneous illumination and comprising a first surface defining a first aperture, the first aperture representing a viewing area of the imager, the hollow chamber also having a second surface at a position above said first aperture, wherein said system is configured so that said imager is supported at a position that is above said encoded indicia and proximate said second surface of said hollow chamber that is configured to exclude extraneous illumination; and
an analysis module in wireless radio communication with said imager, said analysis module including a memory device and a programmed microprocessor, said analysis module in communication with said imager being configured to analyze an image to extract therefrom information regarding the quality of said encoded indicium.

28. The image quality verifier system of claim 27, wherein said source of illumination is incorporated in said imager.

29. The image quality verifier system of claim 27, wherein said source of illumination is incorporated in said chamber.

30. The image quality verifier system of claim 27, wherein said sensor is a two dimensional array of photosensitive elements.

* * * * *